US005619577A

United States Patent [19]

Hasler

[11] Patent Number: 5,619,577

[45] Date of Patent: Apr. 8, 1997

[54] TRANSMISSION SYSTEM, AND A TRANSMITTER AND A RECEIVER FOR USE IN SUCH A SYSTEM

[75] Inventor: Rudolf Hasler, Vienna, Austria

[73] Assignee: U.S. Philips Corporation, New York, N.Y.

[21] Appl. No.: 345,030

[22] Filed: Nov. 23, 1994

[30] Foreign Application Priority Data

Nov. 26, 1993 [EP] European Pat. Off. .............. 93203309

[51] Int. Cl.⁶ ................................................. H04N 5/00
[52] U.S. Cl. .............................. 381/14; 381/81; 381/123; 381/7
[58] Field of Search ................................. 381/7, 14, 123, 381/81, 6, 16

[56] References Cited

U.S. PATENT DOCUMENTS

| 3,257,511 | 6/1966 | Adler | 381/14 |
| 4,194,161 | 3/1980 | Hershberger | 381/7 |
| 5,343,534 | 8/1994 | Dorrough et al. | 381/123 |

FOREIGN PATENT DOCUMENTS 3529835   3/1987   Germany ..................... H04H 5/00

OTHER PUBLICATIONS

"Electronic Engineer's Reference Book", L.W. Turner, London, Newnes–Butterworths, 1976 pp. 15–56 to 59, and pp. 15–166 to 170.

Primary Examiner—Curtis Kuntz
Assistant Examiner—Minsun Oh
Attorney, Agent, or Firm—Edward W. Goodman

[57] ABSTRACT

A simple and effective stereophonic transmission system (1) wherein the transmitter (2) alternatively encodes successive block periods of a block signal with samples of the left-hand channel signal ($L_{in}$) and the right-hand channel signal ($R_{in}$). At receiver side, the left-hand and right-hand stereo signals are decoded from the encoded block signal by alternate integration and peak detection of positive and negative received pulses, the pulse widths of the received pulses corresponding to amplitudes of the transmitted samples. When detecting the pulses for one stereophonic channel, the corresponding other stereophonic channel is blocked.

9 Claims, 2 Drawing Sheets

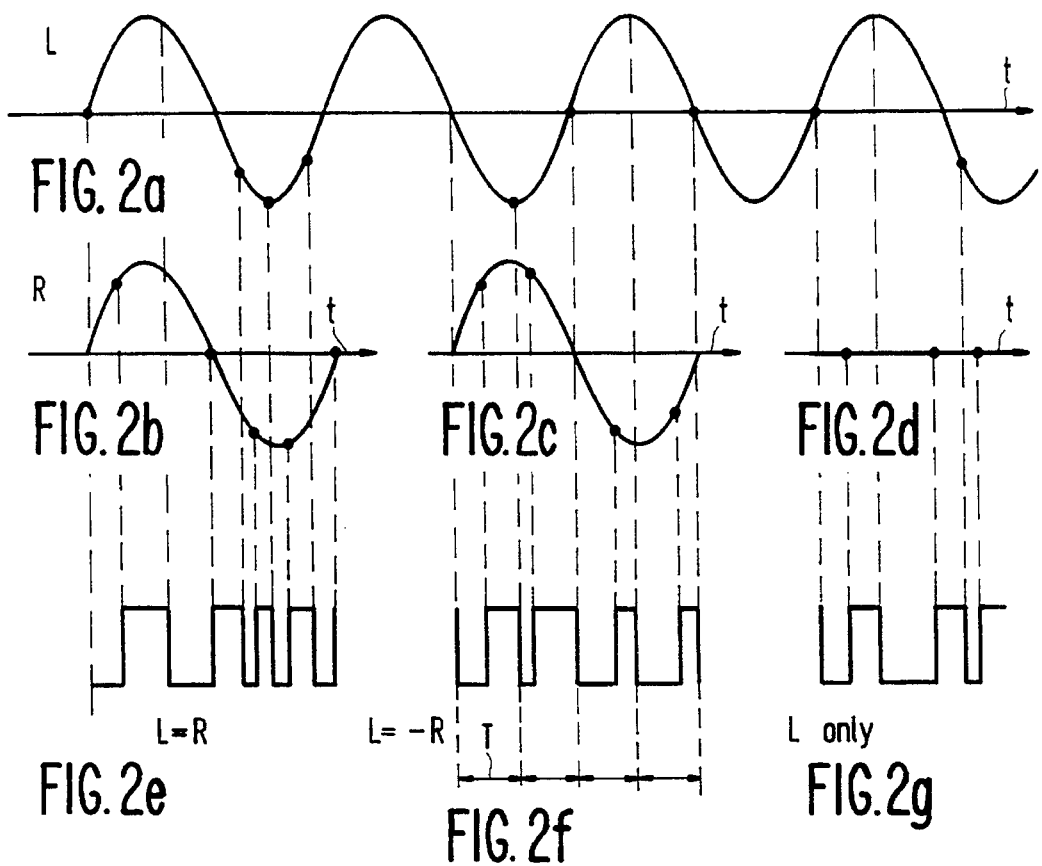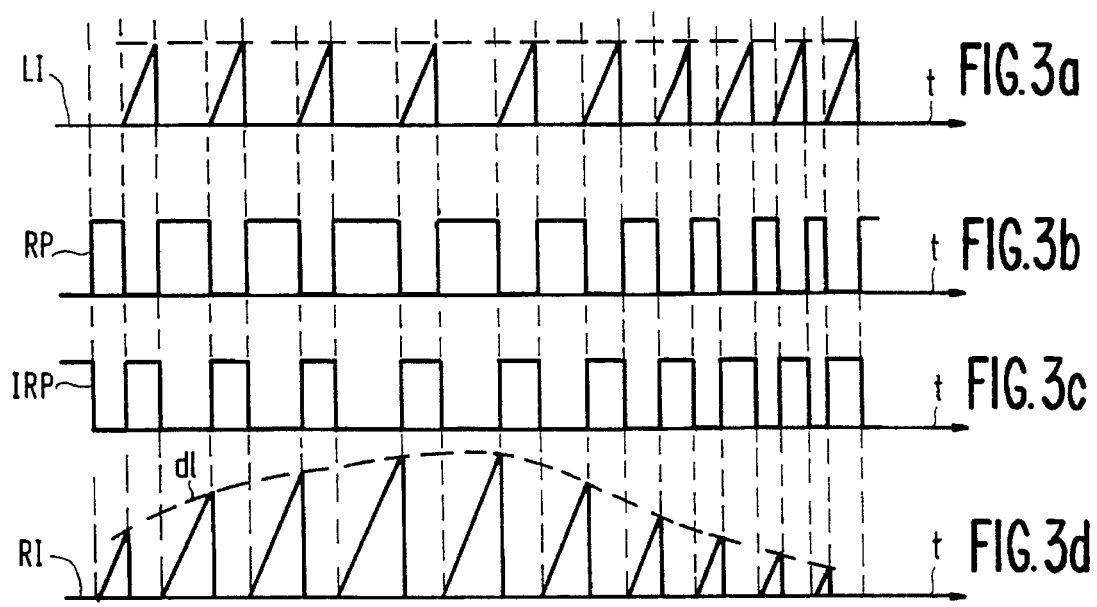

TRANSMISSION SYSTEM, AND A TRANSMITTER AND A RECEIVER FOR USE IN SUCH A SYSTEM

BACKGROUND OF THE INVENTION

1. Field of the Invention

The present invention relates to a transmission system comprising a transmitter having, signal combining means for combining a first and a second signal forming a combined signal and having transmission means for transmitting the combined signal. Such a transmission system can be a broadcasting system for broadcasting stereo signals to receivers, or a system for recording and reproducing stereophonic signals, or any other system for combined signals.

The present invention further relates to a transmitter for use in such a system.

The present invention further relates to a receiver for use in such a system.

2. Description of the Related Art

A transmission system of this kind is known from "Electronics Engineer's Reference Book", L. W. Turner, London, Newnes-Butterworths, 1976, pp. 15–56 to 59, and pp. 15–166 to 170. In this handbook, a well-known stereophonic system is described, in which first and second stereophonic audio signals, the so-called left and right stereo channels, are combined forming a stereophonic transmission signal for broadcasting to receivers. First, a summing signal is formed from the first and the second signal, and further, with the help of a balanced modulator and a sub-carrier at a double frequency of a so-called pilot tone, a difference signal is built. Then, a combined signal, formed from the summing signal, the difference signal, and the pilot tone, is modulated onto a carrier and is transmitted to the receivers. In the receivers, after demodulation, the summing and the difference signals are separated from the pilot tone, and the first and second signals are extracted from the summing and difference signals by respective summing and subtraction of the same by means of a stereo decoder. Such a stereo transmission system is complicated as regards coding and decoding of the left and right stereo signals. Besides, the phase relationship between the pilot tone frequency and the sub-carrier is very critical. Also, such a system requires relatively complicated and time consuming adjustment procedures.

SUMMARY OF THE INVENTION

It is an object of the present invention to provide a simple, non-critical and easily adjustable transmission system of the above kind.

To this end a transmission system according to the present invention is characterized in that the signal combining means comprises a signal generating means providing a signal as the combined signal of which successive periods are alternately modulated by samples of the first and the second signals, respectively. Because information about the first and second signals is comprised in separate parts of a single signals, e.g. a block signals, the first and second signals can be easily retrieved in a receiver. Such a receiver can also be implemented easily.

In an embodiment of a transmission system according to the present invention, the system further comprises a transmission channel and a receiver for receiving the transmitted combined signal through the transmission channel, the receiver having signals separation means for alternately separating the first and the second signal from the received combined signal, the receiver comprising first and second pulse integration means for respective integration of pulses corresponding to the first and second signals, an output of the second integration means being reset when the pulses of the first signal are detected, and vice versa. In this way, pulsed integrator outputs are obtained, peak values of which corresponding to transmitted samples of the first and second signals. The analog first and second signals can be obtained from the peak values by means of simple peak detection means.

In further embodiments of a transmission system according to the present invention, the first and the second signals are stereophonic audio signals, and the combined signal comprises stereo encoded information about the first and the second signals. The system can be used advantageously for wireless transmission of stereo signals, e.g. to a stereo headphone comprising a receiver as according to the present invention. Such a wireless transmission can be carried out by means of an infra-red signal, or by means of a radio signal. In the latter case, the system further comprises an FM (Frequency Modulation) modulator at transmitter side, and an FM alemodulator at receiver side.

In another embodiment of a transmission system according to the present invention, the first and the second signals are measurement signals. The system can thus also be used advantageously for efficient transmission of measurement signals, such as blood pressure signals or the like. In a measurement environment, the encoded signals can be conveyed from a measurement site to a central site by means of glass fiber transmission means.

The present invention will now be described, by way of example, with reference to the accompanying drawings, wherein FIG. 1 shows a transmission system according to the present invention, comprising a transmitter, a receiver, and an infra-red transmission channel, FIG. 2a–2g show timing diagrams for illustrating the operation of a transmitter according to the present invention and FIGS. 3a–3d show timing diagrams for illustrating the operation of a receiver according to the present invention.

Throughout the figures the same reference numerals are used for the same features.

DESCRIPTION OF THE PREFERRED EMBODIMENT

Figure 1:
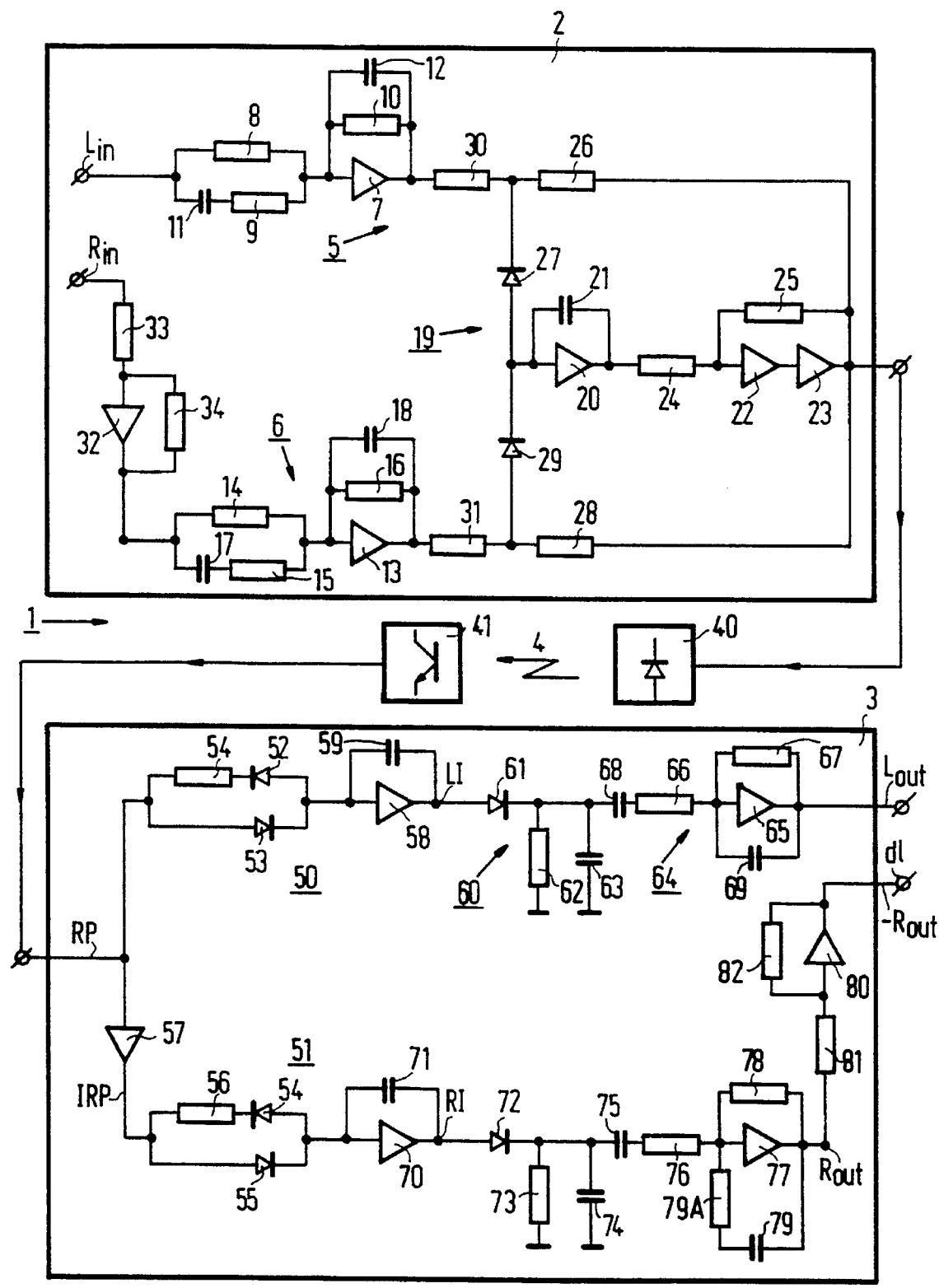

FIG. 1 shows a transmission system 1 according to the present invention, comprising a transmitter 2, a receiver 3, and an infra-red transmission channel 4. The transmission channel 4 may also be a radio channel, or a glass fiber channel, or the like. In case of a radio channel, the transmitter 2 and the receiver 3 additionally comprise an FM-modulator (not shown) and an FM-demodulator (not shown), respectively, both well-known in the art. The transmitter 2 comprises a first transmission branch 5 to which a left-hand channel stereo signal $L_{in}$ as a first signal is fed, and a second transmission branch 6 to which a right-hand channel stereo signal $R_{in}$ is fed. The first transmission branch 5 comprises a preamplifier with pre-emphasis consisting of a amplifier 7 of which resistors 8, 9, and 10, and a capacitor 11 determine its frequency response. Pre-emphasis is applied for improving the signal-to-noise ratio of the system 1. For achieving a linear overall system response, the receiver 3 comprises corresponding de-emphasis means.

A capacitor 12, bridging the amplifier 7, is applied for cutting off signals above the audio frequency band to be transmitted. Correspondingly, the second transmission branch 6 comprises an amplifier 13, resistors 14, 15, and 16, and capacitors 17 and 18. Outputs of the amplifiers are DC-biased to halve the supply voltage of the transmitter 2. The transmitter 2 further comprises controllable block signal generating means 19 comprising an integrator stage with an amplifier 20 and a capacitor 21, and a Schmitt-trigger with amplifiers 22 and 23, and resistors 24 and 25, and further a resistor 26 and a diode 27 for the first transmission branch 5, and a resistor 28 and a diode 29. The resistor 26 and the diode 27 determine the positive block signal period, and the resistor 28 and the diode 29 determine the negative block signal period. A DC-superimposed left-hand channel stereo signal at an output of the amplifier 7 is injected in the junction point formed by the resistor 26 and the diode 27, through a resistor 30, and a DC-superimposed right-hand channel stereo signal at an output of the amplifier 13 is injected in the junction point formed by the resistor 28 and the diode 29. These injected signals modify the integration time of the integrator stage 20, 21 according to momentary values of the supplied audio signals $L_{in}$ and $R_{in}$. In an embodiment, the polarity of the signal $P_{in}$ is inverted by means of an inverting stage comprising an amplifier 32, and resistors 33 and 34. The inverter 32 compensates for the pulse direction caused by the diode 29. For a positive value of the block signal generated by the means 19, the transmission branch 5 is inoperative because the diode 27 is blocking then, while for a negative value of the block signal, the transmission branch 6 is inoperative because the diode 29 is blocking. It is thus achieved that the block signal is alternately modulated by samples of the first and the second signals $L_{in}$ and $R_{in}$. The thus encoded stereo signal is fed to the receiver 3. In the embodiment given, the infra-red transmission channel 4 comprises infra-red transmission means 40 at the transmitter side, and infra-red reception means 41 at the receiver side. Such infra-red transmission means 40 and 41 are well-known in the art. The receiver 3 comprises a first reception branch 50 and a second reception branch 51 for separating the first and the second transmitted stereo signal from the received combined signal. The first reception branch 50, to which the received combined signal is fed, comprises a first part of a alemultiplex switch comprising a parallel arrangement of oppositely arranged diodes 52 and 53, in which a resistor is series connected with the diode 52. From the direction of the transmission channel, the diode 52 is reverse biased. The second reception branch 51, to which the received combined signal is also fed, comprises a corresponding second part of the alemultiplex switch comprising a parallel-series arrangement of a diode 54, a diode 55, and a resistor 56. In the second reception branch 51 an inverter 57 is switched before the second part of the demultiplexer for shifting the phase of the received signal by 180°. The reception branch 50 further comprises a series arrangement of an integrator with an amplifier and a capacitor 59, a peak detector 60 with a diode 61, a resistor 62, and a capacitor 63, and de-emphasis amplifier 64 with an amplifier 65, a resistor 66, a resistor 67, a capacitor 69. At an output of the amplifier 65, a detected left-hand stereo signal $L_{out}$ is available. The second reception branch 51 comprises correspondingly an amplifier 70, a capacitor 71, a diode 72, a resistor 73, a capacitor 74, a capacitor 75, a resistor 76, an amplifier 77, a resistor 78, and a capacitor 79 in series with a resistor 79A. The amplifier 77 is followed by an inverting amplifier 80 with resistors 81 and 82, or not. In case the encoder in the transmitter 2 comprises the inverting amplifier 32, the inverting amplifier 57 in the receiver compensates for its phase shift. In case the transmitter 2 does not comprise the inverting amplifier 32, the inverting amplifier 80 has to be present in order to obtain a phase correct right-to-left signal. For mono operation, the stereo output signals signals can simply be fed to a resistor each (not shown). At a junction of these resistors, a mono signal is then available. For mono operation, the combination of having the inverter 32 in the transmitter 2 and no inverter in the receiver 3, is advantageous as to compensation for pulse phase jitter introduced into the transmission path when the transmitted signals are weak. Due to the inverse mode addition, then occurring, noise contributions to the signals are strongly reduced. Although, advantageously, the same type of peak detectors are used for the left and right channel, because then all signals are with respect to ground, alternatively, complementary peak detectors can be used. In the latter case, the inverter 57 is not present. Such a complementary peak detector can be obtained by reversing the diode 72 and by connecting the resistor 73 and the capacitor 74 to the positive rail (not shown in detail, here). The stereo decode operation in the receiver 3 is as follows. The received combined signal is polarity splitted. The respective left and right channel pulses are convened into respective voltage amplitude signals in the respective integrators 58, 59 and 70, 71. During transmission of a left channel pulse, an output of the fight channel integrator is reset to the negative supply voltage, and vice versa. At the integrator outputs, peak values occur which correspond to samples of the transmitted first and second signals. The peak detector 60 with the successive integrator 64 achieves that sampling frequency is further suppressed. The integration time is chosen such that the transmitter pre-emphasis is compensated for. As to the integration stage 58, 59, the positive integration time is determined by the internal resistance paths of the demultiplexer and by the forward resistance of the diode 53. This resistance is so small that the integration stage 58, 59 reacts very fast. With positive input signals, the capacitor 59 is quickly charged, so that the output of the integration stage 58, 59 is pulled to the negative supply voltage. As a result of this, the peak detector 60 will not rectify any signal. In the reception branch 50, negative received combined signals are coupled to the integration stage 58, 59 via the series arrangement of the resistor 54 and the diode 52. Herewith, the negative integration time essentially is determined by the resistor 54. Thus, with each received pulse, an end value of the integration stage output corresponds to the pulse width of the received pulse, and each negative pulse is converted to a corresponding analog peak voltage. Correspondingly, in the reception branch 51, positive pulses are converted to analog peak voltages. Both in the transmitter 2 and in the receiver 3, for cost reduction purposes, ahex amplifier IC, type PC 74 HCU, can advantageously be applied.

FIGS. 2a–2g show timing diagrams for illustrating the operation of the transmitter 2 according to the present invention. Shown are time diagrams as a function of time t, in which FIG. 2a shows the left-hand stereo signal L in the transmitter branch 5. FIG. 2b shows the right-hand stereo signal R in the transmitter branch 6, where R=L. In this case, alternate samples of the left-hand stereo signal (in FIG. 2a) and the right-hand stereo signal (in FIG. 2b) are converted into a frequency modulated block pulse signal with a constant pulse width duty cycle (FIG. 2e). FIG. 2c shows the right-hand stereo signal in the transmitter branch 6, where -R=L. In this case, alternate samples of the left-hand stereo signal (in FIG. 2a) and right-hand stereo signal (in FIG. 2c) are converted into a pulse width modulated signal with constant frequency (FIG. 2f). The diagrams for R=L and -R=L represent an extreme mono signal and an extreme stereo signal as the input signals $L_{in}$ and $R_{in}$, respectively, and are shown for illustrating how the input information is encoded into a signal to be transmitted. Thus, in practical situations, the transmitted signal is a combined frequency and pulse width modulated signal, and no summing signals or difference signals, such as in conventional stereo systems, are formed. FIG. 2d shows the situation where there is no right-hand stereo signal, and FIG. 2g shows the modulated block pulse signals when, as such, only the left-hand stereo signal (in FIG. 2a) is available. the block pulse period is indicated with T, e.g., corresponding to a frequency of 38 kHz. With infra-red transmission this intermediate frequency may be between 60 and 80 kHz.

FIGS. 3a–3d show timing diagrams for illustrating the operation of the receiver 3 according to the present invention. Only the right-hand channel is shown. Shown are received pulses RP (FIG. 3b), inverse received pulses IRP (FIG. 3c) an output signal LI (FIG. 3a), of the left-hand channel integrator 58, 59, and an output signal RI (FIG. 3d) of the right-hand channel integrator 70, 71. As shown in FIG. 3d with a dashed line dl, a reconstructed right-channel stereo signal is indicated.

I claim:

1. A transmission system comprising a transmitter having signal combining means for combining a first signal and a second signal to form a combined signal, and having transmission means for transmitting the combined signal, characterized in that the signal combining means comprises periodic signal generating means for providing a signal, as the combined signal, in which successive periods having different polarity which are modulated alternately in relation to the sampling of the first signal and the second signal, respectively.

2. A transmission system according to claim 1, wherein the periodic signal is a block signal.

3. A transmission system according to claims 1, wherein said transmission system further comprises a transmission channel and a receiver for receiving the transmitted combined signal through the transmission channel, the receiver having signal separation means for alternately separating the first signal and the second signal from the received combined signal, said signal separation means comprising first pulse integration means and second pulse integration means for respectively integrating pulses corresponding to the first signal and second signal, an output of the second pulse integration means being reset when the pulses of the first signal are detected, and an output of the first pulse integration means being reset when the pulses of the second signal are detected.

4. A transmission system according to claims 1, wherein the first signal and the second signal are stereophonic audio signals, and the combined signal comprises stereo encoded information about the first signal and the second signal.

5. A transmission system according to claims 1, wherein the first signal and the second signal are measurement signals.

6. A transmission system according to claim 2, wherein the transmission channel is an infra-red transmission channel.

7. A transmission system (1) according to claim 2, wherein the transmitter comprises frequency modulating means for modulating the combined signal onto a carrier, and the receiver comprises frequency demodulating means for demodulating the received combined signal (RP), whereby the demodulated signal is fed to the separating means, and the transmission channel is a channel for conveying electromagnetic waves.

8. A transmitter for use in a transmission system, the transmitter having signal combining means for combining a first signal and a second signal to form a combined signal, and having transmission means for transmitting the combined signal, characterized in that the signal combining means comprises signal generating means for providing a signal, as the combined signal, in which successive periods having different polarity which are modulated alternately in relation to the sampling of the first signal and the second signal, respectively.

9. A receiver for receiving a block signal as a combined signal of which successive block periods having different polarity are alternately modulated with samples of a first signal and a second signal, the receiver having signal separation means for alternately separating the first signal and the second signal from the received combined signal, said signal separation means comprising first pulse integration means and second pulse integration means for respectively integrating pulses corresponding to the first signal and second signal, an output of the second pulse integration means being reset when the pulses of the first signal are detected, and an output of the first pulse integration means being reset when the pulses of the second signal are detected.

* * * * *